(12) United States Patent
Hanson et al.

(10) Patent No.: US 8,236,426 B2
(45) Date of Patent: *Aug. 7, 2012

(54) INORGANIC SUBSTRATES WITH HYDROPHOBIC SURFACE LAYERS

(75) Inventors: Eric L. Hanson, Carlsbad, CA (US); Eric L. Bruner, San Diego, CA (US)

(73) Assignee: Aculon, Inc., San Diego, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/066,389

(22) Filed: Apr. 13, 2011

(65) Prior Publication Data

US 2011/0195246 A1    Aug. 11, 2011

Related U.S. Application Data

(63) Continuation of application No. 12/080,057, filed on Mar. 31, 2008, now Pat. No. 8,025,974.

(60) Provisional application No. 60/921,769, filed on Apr. 4, 2007.

(51) Int. Cl.
*B32B 15/04* (2006.01)
*B32B 27/00* (2006.01)

(52) U.S. Cl. ........................ 428/421; 428/458

(58) Field of Classification Search .................. None
See application file for complete search history.

(56) References Cited

U.S. PATENT DOCUMENTS

| | | | | |
|---|---|---|---|---|
| 3,920,793 A | 11/1975 | Teti et al. | | 428/215 |
| 5,730,922 A | 3/1998 | Babb et al. | | 264/258 |
| 6,653,495 B2 | 11/2003 | Russo et al. | | 558/114 |
| 6,828,284 B2 | 12/2004 | Howell et al. | | 508/182 |
| 6,852,266 B2 | 2/2005 | Robinson et al. | | 264/442 |
| 7,141,140 B2 | 11/2006 | Maccone et al. | | 162/135 |
| 7,148,360 B2 | 12/2006 | Flynn et al. | | 548/264.6 |
| 2004/0247886 A1 | 12/2004 | Kudo et al. | | 428/421 |
| 2005/0136180 A1 | 6/2005 | Pellerite et al. | | 427/162 |
| 2007/0015864 A1 | 1/2007 | Hintzer et al. | | 524/544 |
| 2008/0152930 A1 | 6/2008 | Hanson | | 428/447 |

FOREIGN PATENT DOCUMENTS

| | | |
|---|---|---|
| WO | WO 01/66353 A1 | 9/2001 |
| WO | WO 02/092646 A1 | 11/2002 |
| WO | WO 2004/058419 A1 | 7/2004 |
| WO | WO 2008/024475 A2 | 2/2008 |
| WO | WO 2008/060582 A2 | 5/2008 |
| WO | WO 2008/060583 A2 | 5/2008 |

*Primary Examiner* — Callie Shosho
*Assistant Examiner* — Krista Lynch
(74) *Attorney, Agent, or Firm* — William J. Uhl

(57) ABSTRACT

Inorganic substrates with a hydrophobic surface layer of a fluorinated material having the following structure are disclosed:

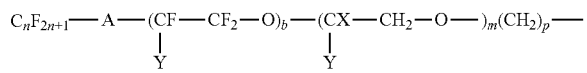

where A is an oxygen radical or a chemical bond; n is 1 to 20; Y is H, F, $C_nH_{2n+1}$ or $C_nF_{2n+1}$; X is H or F; b is at least 1, m is 0 to 50, and p is 1 to 20. The fluorinated material can be directly adhered to the inorganic substrate or can be indirectly adhered to the inorganic substrate through an intermediate organometallic coating.

24 Claims, 1 Drawing Sheet

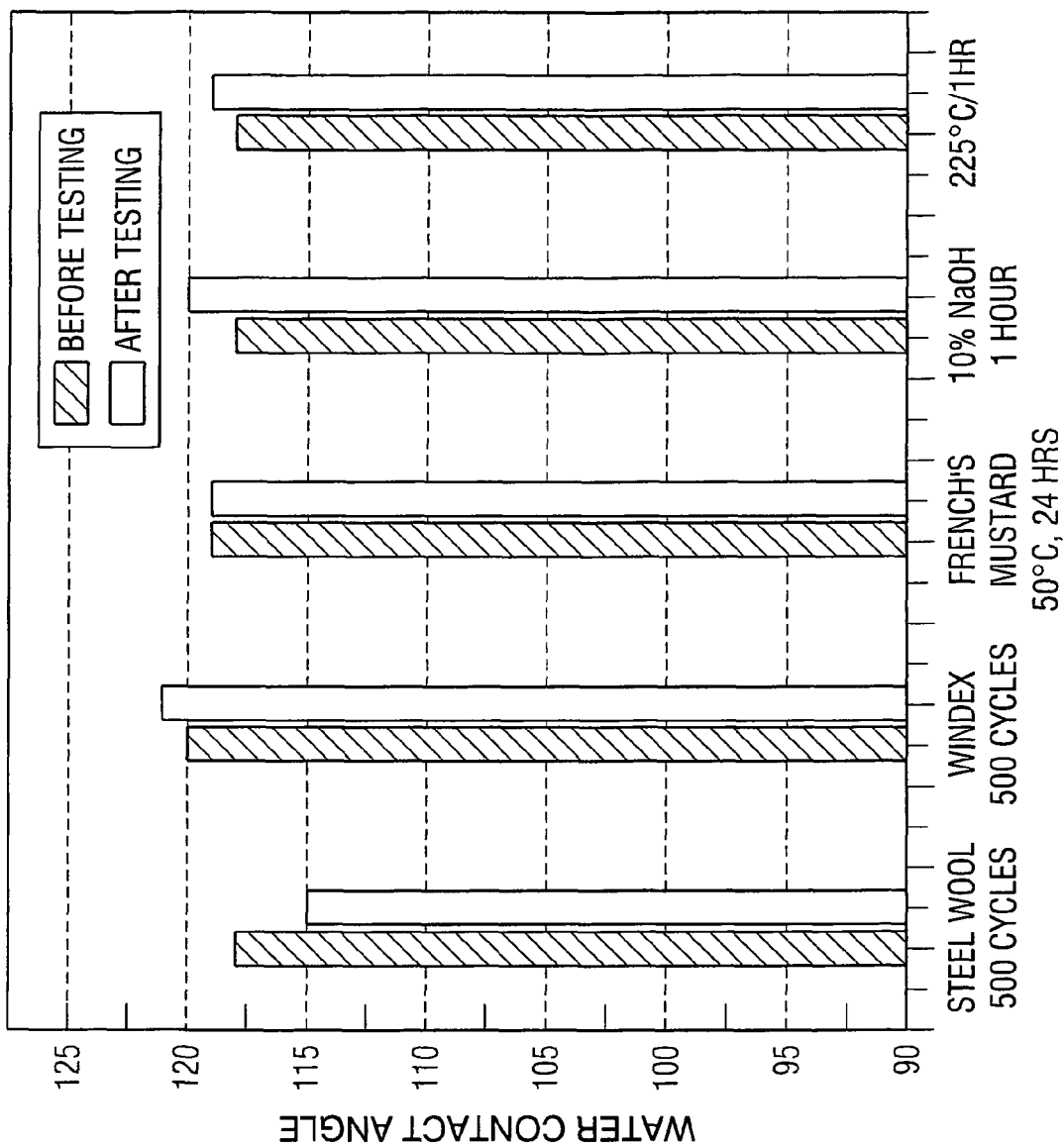

INORGANIC SUBSTRATES WITH HYDROPHOBIC SURFACE LAYERS

CROSS REFERENCE TO RELATED APPLICATIONS

The present application is a continuation of U.S. patent application Ser. No. 12/080,057, filed Mar. 31, 2008, now U.S. Pat. No. 8,025,974, which claims priority from U.S. Provisional Patent Application Ser. No. 60/921,769, filed Apr. 4, 2007.

FIELD OF THE INVENTION

The present invention relates to metal substrates with hydrophobic surface layers and to their methods of preparation.

BACKGROUND OF THE INVENTION

Household appliances such as refrigerators, washers, dryers and grills typically have a metal housing such as mild steel and a coating to protect the metal from corrosion. However, many appliances are being made from polished or brushed metals such as stainless steel, copper, brass and aluminum that have a glamorous look that fits in with many different color environments where the appliances are used. Also, the stainless steel does not require a protective coating.

One of the disadvantages of stainless steel is a tendency to show fingerprints, smudges and staining. Surprisingly, the fingerprints and smudges adhere well to the stainless steel and are difficult to remove, and after cleaning, quickly reappear. It would be desirable to treat the metal surfaces, such as stainless steel surfaces, to make them more resistant to smudging and fingerprints, and to make the substrates easier to clean.

SUMMARY OF THE INVENTION

The present invention provides an inorganic substrate with a surface layer of a fluorinated material having the following structure:

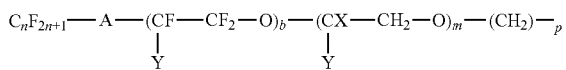

where A is an oxygen radical or a chemical bond; n is 1 to 20; Y is H, F, $C_nH_{2n+1}$ or $C_nF_{2n+1}$; b is at least 1; X is H or F; m is 0 to 50 and p is 1 to 20. The fluorinated material can be adhered directly to the metal substrate or can be adhered through an intermediate organometallic coating.

The invention also provides for a method of depositing the fluorinated material on an inorganic substrate surface comprising:

(a) contacting the surface either directly or through an intermediate organometallic layer with a fluorinated material, the fluorinated material having the following structure:

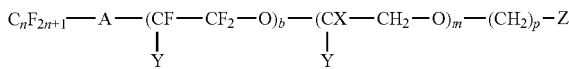

where A is an oxygen radical or a chemical bond; n is 1 to 20; Y is H, F, $C_nH_{2n+1}$; b is at least 1; X is H or F; m is 0 to 50; p is 1 to 20, and Z is an acid or an acid derivative.

(b) forming film adhered to the inorganic substrate or to the intermediate organometallic layer.

BRIEF DESCRIPTION OF THE DRAWING

FIG. 1 is a graph showing the change in water contact angle for coated stainless steel coupons before and after testing described in Example 2.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is also meant to include copolymer and oligomer.

The term "acid" is meant to include substances that donate a proton in a chemical reaction to a base. The term "acid derivative" is meant to include materials that behave similarly to acids such as acid salts, and acid esters, particularly lower alkyl esters containing from 1 to 4 carbon atoms.

The term "solutions" is meant to include homogeneous mixtures of one substance in another. Liquid solutions are optically clear because the particle size of the dissolved material is less than the wavelength of visible light. The term "dispersions" are meant to include non-homogeneous mixtures of one substance in another. Liquid dispersions are translucent and also include emulsions that are optically opaque because the particle size of the dispersed particle is greater than the wavelength of visible light. The dispersed material itself may be of such particle size or it may associate with itself or the dispersing medium forming micelles.

The term "metal" is meant to include metals, metal alloys and metalloids.

Examples of inorganic substrates are metals and metal compounds, such as those which have groups on their surface that are reactive with functional groups associated with the fluorinated material and the organometallic intermediate coating. Examples of such groups are oxide and/or hydroxyl groups. Examples of materials which form metal oxide surfaces and surfaces containing hydroxyl groups upon exposure to ambient conditions include iron substrates such as steels, including stainless steels, such as T-201, T-304, T-430, 316 and 17-4 and metals which acquire a non-ablating oxide coating upon exposure to the ambient environment, for example, tantalum, copper, aluminum and their respective alloys. The metals are typically used as housings for household appliances such as refrigerators, cooking ranges, grills, clothes washers and dryers. The metal substrate can also be a composite in which the metal such as steel is coated with a coating of other metals and materials such as silicon, tantalum and copper and hard coatings such as chromium, platinum, titanium, chromium oxide, chromium nitride, aluminum oxide, etc. See, for example, U.S. Pat. No. 3,754,329. Besides the metals and metal compounds mentioned above, the inorganic substrate may comprise a metalloid such as silicon, a metal alloy such as brass and a ceramic substrate such as porcelain, granite and silica.

The fluorinated material is a material containing perfluoroalkylene ether groups of the structure:

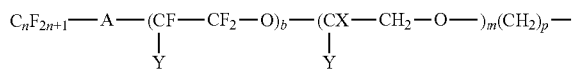

where A is an oxygen radical or a chemical bond; n is 1 to 20, preferably 1 to 6 and more preferably 1 to 2; Y is H, F, $C_nH_{2n+1}$ or $C_nF_{2n+1}$; X is H or F; b is at least 1, preferably at least 2, more preferably 2 to 50 and most preferably 5 to 12; m is 0 to 50, preferably 1 to 20, more preferably 0 to 6, and p is 1 to 20, preferably 2 to 10, more preferably 2 to 4 and most preferably 2 to 3. Preferably, p is 2 to 3, and m is 0 and b is 5 to 12; A is oxygen; n is 1 to 2, Y is $C_nF_{2n+1}$. The perfluoroalkylene ether groups are derived from an acid or an acid derivative, that is:

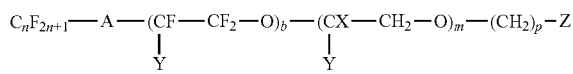

where n, A, Y, X, b, m and p are as defined above and Z is an acid group or an acid derivative. The acid can be an organic such as a carboxylic acid or a phenol or an inorganic acid such as sulfuric acid or phosphoric acid or contain both organic and inorganic moieties, such as organo phosphonic acids or organo sulfuric and sulfonic acids. Preferably, Z is:

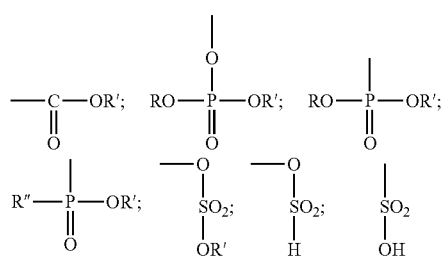

where R" is a hydrocarbon or substituted hydrocarbon radical having up to 200, such as 1 to 30 and 6 to 20 carbons, R" can also include the perfluoroalkyl groups mentioned above, and R and R' are H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons. The phosphorus acids are the most preferred.

For application to the surface of the substrate, the perfluoroalkylene ether is typically dissolved in a liquid diluent. The concentration is usually dilute, for example, no greater than 10 percent on a weight basis, and preferably is within the range of 0.01 to 1.0 percent. The percentages are based on total weight of the solution.

Examples of suitable diluents are hydrocarbons such as hexane isooctane and toluene; ketones such as acetone and methyl ethyl ketone; alcohols such as methanol and ethanol; ethers such as tetrahydrofuran; esters such as ethyl acetate and t-butyl acetate. Fluorinated solvents such as nonafluorobutylmethyl ether available as HFE 7100, supplied by 3 M Innovative Products, and fluorinated solvents such as hexafluoropropylene oxide and oligomers and polymers of perfluorinated ethers supplied by Solvay Solexis under the trademark GALDEN are preferred. The fluorinated solvents can be used in admixtures with the other solvents mentioned above. The fluorinated solvents or diluents are different from the perfluoroalkylene ethers in that the fluorinated solvents or diluents are not film formers, whereas the perfluoroalkylene ethers are. Preferably, the vapor pressure of the diluent is high, permitting rapid evaporation at room temperature (20-25° C.). The perfluoroalkylene ether can be dissolved easily upon adding it to the diluent.

The solution of the perfluoroalkylene ether can be applied to the surface of the inorganic substrate by dipping, rolling, spraying or wiping. After application, the diluent is permitted to evaporate, with or without wiping, preferably at ambient temperature, or optionally by the application of heat.

The resultant layer typically is thin, having a thickness of no greater than 100, typically about 10-100 nanometers or less. The layer is usually hydrophobic, having a water contact angle greater than 70°, typically from 75-130°. Contact angles greater than 130° are possible but usually require some type (chemical or mechanical) of surface roughening. The water contact angle can be determined using a contact angle goniometer such as a TANTEC contact angle meter Model CAM-MICRO.

As mentioned above, the perfluoroalkylene ether can be applied directly to the metal substrate or can be applied indirectly to the metal substrate through an intermediate organometallic coating. When better adhesion and durability is desired, an organometallic coating should be applied to the metal substrate followed by application of the perfluoroalkylene ether.

The organometallic compound is preferably derived from a metal or metalloid, preferably a transition metal, selected from Group III and Groups IVB, VB and VIB of the Periodic Table. Transition metals are preferred, such as those selected from Groups IIIB, IVB, VB and VIB of the Periodic Table. Examples are tantalum, titanium, zirconium, lanthanum, hafnium and tungsten. The organo portion of the organometallic compound is selected from those groups that are reactive with the acids (or their derivatives) of the perfluoroalkylene ether. Also, as will be described later, the organo group of the organometallic compound is believed to be reactive with groups on the surfaces being treated such as oxide and hydroxyl groups. Examples of suitable organo groups of the organometallic compound are alkoxide groups containing from 1 to 18, preferably 2 to 4 carbon atoms, such as ethoxide, propoxide, isopropoxide, butoxide, isobutoxide, tert-butoxide and ethylhexyloxide. Mixed groups such as alkoxide, acetyl acetonate and chloride groups can be used.

The organometallic compounds can be in the form of simple alkoxylates or polymeric forms of the alkoxylate, and various chelates and complexes. For example, in the case of titanium and zirconium, the organometallic compound can include:

a. alkoxylates of titanium and zirconium having the general formula $M(OR)_4$, wherein M is selected from Ti and Zr and R is $C_{1-18}$ alkyl, b. polymeric alkyl titanates and zirconates obtainable by condensation of the alkoxylates of (a), i.e., partially hydrolyzed alkoxylates of the general formula $RO[-M(OR)_2O-]_{x-1}R$, wherein M and R are as above and x is a positive integer, c. titanium chelates, derived from ortho titanic acid and polyfunctional alcohols containing one or more additional hydroxyl, halo, keto, carboxyl or amino groups capable of donating electrons to titanium. Examples of these chelates are those having the general formula $$Ti(O)_a(OH)_b(OR')_c(XY)_d$$

wherein a=4−b−c−d; b=4−a−c−d; c=4−a−b−d; d=4−a−b−c; R' is H, R as above or X—Y, wherein X is an electron donating group such as oxygen or nitrogen and Y is an aliphatic radical having a two or three carbon atom chain such as i. —$CH_2CH_2$—, e.g., of ethanolamine, diethanolamine and triethanolamine,

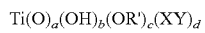

ii. e.g., of lactic acid,

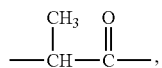

iii. e.g., of acetylacetone enol form, and

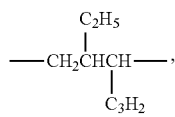

iv. e.g., as in 1,3-octyleneglycol, d. titanium acrylates having the general formula $Ti(OCOR)_{4-n}(OR)_n$ wherein R is $C_{1-18}$ alkyl as above and n is an integer of from 1 to 3, and polymeric forms thereof, e. mixtures thereof.

The organometallic compound is usually dissolved or dispersed in a diluent. Examples of suitable diluents are alcohols such as methanol, ethanol and propanol, aliphatic hydrocarbons, such as hexane, isooctane and decane, ethers, for example, tetrahydrofuran and dialkyl ethers such as diethyl ether. Alternatively, the organometallic compound can be applied by vapor deposition techniques.

Also, adjuvant materials may be present with the organometallic compound and the diluent (organometallic compositions). Examples include stabilizers such as sterically hindered alcohols, surfactants and anti-static agents. The adjuvants if present are present in amounts of up to 30 percent by weight based on the non-volatile content of the composition.

The concentration of the organometallic compound in the composition is not particularly critical but is usually at least 0.01 millimolar, typically from 0.01 to 100 millimolar, and more typically from 0.1 to 50 millimolar.

The organometallic treating composition can be obtained by mixing all of the components at the same time or by combining the ingredients in several steps. If the organometallic compound chosen is reactive with moisture, (e.g. in the case of titanium (IV) n-butoxide, tantalum (V) ethoxide, aluminum (III) isopropoxide etc,) care should be taken that moisture is not introduced with the diluent or adjuvant materials and that mixing is conducted in a substantially anhydrous atmosphere.

The organometallic composition can be applied to the metal substrate surface by conventional means such as immersion coating such as dipping, rolling, spraying or wiping to form a film. The diluent is permitted to evaporate. This can be accomplished by heating to 50-200° C. or by simple exposure to ambient temperature, that is, from 20-25° C. It is believed that the resulting film is in the form of a polymeric metal oxide in multilayer form with unreacted alkoxide and hydroxyl groups. This is accomplished by depositing the film under conditions resulting in hydrolysis and self-condensation of the alkoxide. These reactions result in a polymeric coating being formed that provides cohesive strength to the film. The conditions necessary for these reactions to occur is to deposit the film in the presence of water, such as a moisture-containing atmosphere, however, these reactions can be performed in solution by the careful addition of water. The resulting film has some unreacted alkoxide groups and/or hydroxyl groups for subsequent reaction and possible covalent bonding with an overlayer material. However, for readily co-reactive groups, ambient temperatures, that is, 20° C., may be sufficient. Although not intending to be bound by any theory, it is believed the polymeric metal oxide is of the structure:

$$[M(O)_x(OH)_y(OR)_z]_n$$

where M is the metal of the invention, R is an alkyl group containing from 1 to 30 carbon atoms; x+y+z=V, the valence of M; x is at least 1, y is at least 1, z is at least 1; x=V−y−z; y=V−x−z; z=V−x−y; n is greater than 2, such as 2 to 1000.

The resulting film typically has a thickness of 0.5 to 100 nanometers. For other applications, thicker films can be used. When the organometallic compound is used neat and applied by chemical vapor deposition techniques in the absence of moisture, a thin metal alkoxide film is believed to form. Polymerization, if any occurs, is minimized and the film may be in monolayer configuration. When the organometallic compound is subjected to hydrolysis and self-condensation conditions as mentioned above, thicker films are formed.

Although not intending to be bound by any theory, it is believed the acid or acid derivative groups of the perfluoroalkylene ether covalently bond with the oxide or hydroxyl groups on the surface of the substrate being treated or covalently bond with the hydroxyl or alkoxide group of the organometallic coating, resulting in a durable film. It is believed that the perfluorinated materials described above form a self-assembled layer which may be at least in part a monolayer on the surface of the substrate. Self-assembled layers or films are formed by the adsorption and spontaneous organization of the perfluorinated material on the surface of the substrate. The fluorinated materials useful in the practice of the invention are amphiphilic molecules that have two functional groups. The first functional group, i.e., the head functional group, is the polar group Z in the structures depicted above and attaches via covalent bonding to the surface of the substrate. The second functional group, the perfluoroalkylene ether group, i.e., the tail, is covalently bonded to the first functional group and extends outwardly from the surface of the substrate. Optionally, a subsequent layer, such as a layer of polytetrafluoroethylene, a siloxane-based (e.g. a layer of polyfluorooctyl(triethoxy)siloxane or a polysiloxane) coating can be applied to the perfluoroalkylene ether layer.

Optionally, the surface layer can have excess fluorinated material on the monolayer surface. If the monolayer is damaged, the excess fluorinated material is available for repair by forming a monolayer over the damaged area.

Also, the surface layer may optionally be a mixture of the fluorinated material with another material such as a different fluorinated material such as polytetrafluoroethylene or a material such as an organosiloxane material.

The resultant fluorinated surfaces are easy to clean requiring only light rubbing with a cloth. Eventually, the fluorinated layer may have to be renewed. However, the organometallic coating is very durable and under normal conditions will last for the life of the appliance.

EXAMPLES

The following examples are intended to illustrate the invention, and should not be construed as limiting the invention as many different embodiments can be made without departing from the spirit and scope of the invention. Therefore, the invention is not limited except as defined in the claims.

Stainless steel coupons were cleaned by degreasing in acetone, scrubbed with caustic, rinsed with water and blown dry with nitrogen.

Testing samples were coated with the perfluorinated material of the invention and subjected to a variety of simulated tests including various chemical and mechanical attacks. Effects of the tests were estimated by observing the change in water contact angle.

The details of the sample preparation and the testing is as follows.

Sample Preparation:

Stainless steel coupons were cleaned of milling/machining oils and other contaminants by the following method that is similar to those used in the steel industry:

A protective vinyl sheet was removed from the panel followed by rinsing with a stream of acetone (3 seconds), followed by tap water rinse (5 seconds), scrubbing with 3% aqueous KOH (15 seconds), tap water (5 seconds) then deionized water rinse (5 seconds) and finally blowing dry with compressed nitrogen. Surfaces prepared in this manner supported a thin film of deionized water with no spotting/beading of the water film upon standing for 30 seconds on a flat surface. Water contact angle measurements (WCA) on such surfaces were <10 degrees.

Sample Evaluation:

Coupons with the perfluorinated surface layer of the invention were evaluated as follows:

WCA: water contact angle measurements were taken to evaluate the hydrophobicity of sample surfaces using a Tantec CAM-Plus and distilled/deionized water.

SCA: squalene contact angle measurements were taken to evaluate the hydrophobicity of sample surfaces using a Tantec CAM-Plus and 99% squalene (Sigma-Aldrich).

Stain release: 0.5 mL drops of liquid egg whites ("All Whites" by Papetti Foods) and 0.5 mL of liquid egg ("Egg Beaters" by ConAgra Foods) were spread across the coupon surfaces and heated to 100° C. to stain the coupon surfaces. Also, French's yellow mustard (French's Foods), Tapatio hot sauce (Tapatio Foods), and soy sauce (Kikkoman) were placed on the coupon surfaces in a line across the width of the coupon using a cotton swab soaked with the product and heated to 100° C. An attempt to remove the stains with a clean cotton cloth was made first, secondly followed by soaking the stains with Windex (SC Johnson) and wiping with a damp cotton cloth. The ease of removal was judged by the difficulty in removing the stains with the two methods. Another, simpler method involved drawing an "X" mark across the coupon with a fine-tipped black Sharpie marker, waiting 5 minutes for the ink to dry then attempting to remove the mark with a clean tissue.

Durability: The samples were subjected to a variety of torture tests to simulate harsh environmental conditions, including: 500 cycles of rubbing under a 200 g/cm$^2$ load with (1) 0000 steel wool, (2) a Brasso brand stainless steel polish, (3) Windex-soaked cellulose tissue (Kimwipes by Kimberly Clark), (4) isopropanol-soaked cellulose tissues, (5) cellulose tissues soaked with a variety of cleaners (Fantastic Oxy-Power, Easy-Off, Lestoil, etc.). Also, samples were immersed in solutions of 10% NaOH and 5% NaCl in water, French's yellow mustard, 1% citric acid, boiling water and hydrogen peroxide. Coupons were also subjected to thermal attack in the 200-300° C. range to determine the resistance of the coating to atmospheric oxidation. The change in WCA was measured after testing to estimate the effect of the test on the sample surface.

Example 1

A 0.1% solution of a perfluorinated phosphonic acid ("PFPA") having the following structure:

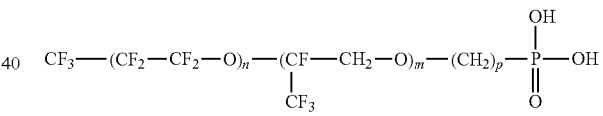

where n=1-14; m=1 and p=3
was prepared by dissolving 0.2 grams of PFPA in 5 mL of HFE-7100 (3M Innovative Products), followed by addition of 95 mL of ethanol with stirring. This solution was then sprayed (via a finger pump sprayer—Continental AFA) onto a 3"x1" T-430 alloy brushed stainless steel coupon and after waiting for 15-30 seconds, buffed dry with a clean cloth. Samples thus treated were highly hydrophobic (WCA ~120 degrees) and oleophobic (SCA ~90 degrees).

Durability results: The prepared samples were extremely resistant to attack by the aforementioned tests; the only methods that were found to reduce the WCA were using Brasso stainless steel polish (decrease from 120° to 60°), heating above 225° C. for 1 hour (decrease from 120° to 70°), and immersion in French's mustard at 55° C. for 24 hours (decrease from 120° to 50°) and immersion in 10% NaOH for 1 hour (decrease from 120° to 30°). All other test methods resulted in little/no change in WCA.

Stain release: The hot sauce and soy sauce were easily removed from the treated surface with a dry cloth, whereas the mustard left a visible stain after rubbing. The egg products simply lifted off the treated surface during heating and fell off when the sample was tilted. As a control, all stains made on untreated stainless steel could only be removed with the assistance of soaking them in Windex followed by rubbing with a damp cloth. Furthermore, the steel surface on the untreated sample had noticeable evidence of oxidation underneath the stain. Samples treated with the perfluorinated compound in this manner repelled the dried Sharpie ink; it was easily removed (5-6 wipes) from the surface with a dry cloth. It was impossible to remove the dried Sharpie ink from the untreated sample without the assistance of solvent (methanol).

Example 2

A 1% solution of tantalum (V) ethoxide in anhydrous isopropanol was prepared and 0.5 mL was spread in a line across the top of a 3"×1" T-430 alloy brushed stainless steel coupon. A cotton-cloth wrapped iron rod was then drawn down the length of the steel coupon as used in Example 1 to evenly coat the surface with a surface-bound thin film of a polymer tantalum oxide with alkoxide and hydroxide groups. Then, the solution from Example 1 was spread in a similar manner (to the tantalum (V) ethoxide film) down the surface of the coupon. The sample thus treated had a WCA of ~120° and a SCA of ~90°.

Durability testing was conducted as generally described for Example 1. The results of the testing are reported in FIG. 1.

For stain release testing, a drop of mustard was deposited on both coated and uncoated steel coupons and then heated at 150° C. for 15 minutes, which resulted in a hard, dried mustard residue. The dried mustard could not be removed from the uncoated panel without scrubbing with a razor blade and steel wool. Furthermore, a ghost image of oxidized steel was left behind on the surface that could not be removed without polishing. On the coated sample, however, the mustard stain lifted from the surface during heating and was easily flicked off. No staining of the sample surface was evident.

The invention is now set forth in the following claims.

What is claimed is:

1. An inorganic substrate with a surface layer of a fluorinated material having the following structure:

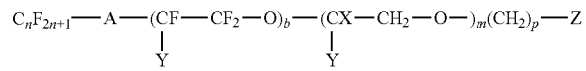

where A is an oxygen radical or a chemical bond; n is 1 to 20; Y is H, F, $C_nH_{2n+1}$ or $C_nF_{2n+1}$; X is H or F; b is at least 1, m is 0 to 50, p is 1 to 20 and Z is a phosphorus acid group.

2. The substrate of claim 1 being metal.

3. The substrate of claim 2 in which the metal is iron.

4. The substrate of claim 2 in which the metal is stainless steel.

5. The substrate of claim 2 in which the metal is steel that has a coating of a different metal or a metal oxide selected from a chromium, tantalum, silicon, copper, titanium and aluminum oxide.

6. The substrate of claim 2 in which the metal is a metal alloy.

7. The substrate of claim 1 in which the surface layer has a water contact angle greater than 70°.

8. The substrate of claim 1 in which the surface layer has a thickness less than 100 nanometers.

9. The substrate of claim 1 in which the surface layer is a self assembled layer.

10. The substrate of claim 9 in which the surface layer is in a monolayer configuration.

11. The substrate of claim 10 which has excess fluorinated material on the monolayer.

12. The substrate of claim 1 in which the layer of fluorinated material has an overlayer selected from polytetrafluoroethylene and a siloxane-based material.

13. The substrate of claim 1 in which the surface layer comprises a mixture of the fluorinated material and a different material.

14. The substrate of claim 1 in which Z is selected from:

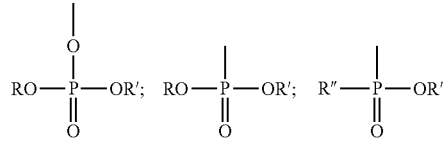

where R" is a hydrocarbon or substituted hydrocarbon radical having up to 200 carbons, and R and R' are each independently H, a metal or an amine or an aliphatic or substituted aliphatic radical having 1 to 50 carbons or an aryl or substituted aryl radical having 6 to 50 carbons.

15. The substrate of claim 14 in which Z is

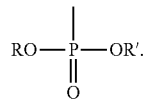

16. The substrate of claim 15 in which the fluorinated material has the following structure:

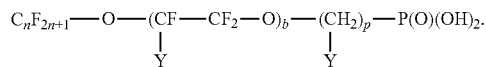

17. The substrate of claim 1 in which the fluorinated material is adhered to an intermediate organometallic layer.

18. The substrate of claim 17 in which the organometallic layer is derived from a metal alkoxide.

19. The substrate of claim 18 in which the metal of the organometallic layer is selected from titanium and tantalum.

20. The substrate of claim 17 in which the intermediate organometallic layer is a polymeric metal oxide with alkoxide and hydroxyl groups.

21. The substrate of claim 20 in which the polymeric metal oxide is covalently bonded to the substrate.

22. The substrate of claim 21 in which the covalent bond is formed through the reaction of surface oxide and/or hydroxyl groups associated with the substrate with the alkoxide and/or hydroxyl groups associated with the polymeric metal oxide.

23. The substrate of claim 20 in which the fluorinated material is covalently bound to the polymeric metal oxide.

24. The substrate of claim 23 in which the covalent bonding is formed through reaction of the acid or acid derivative groups of the fluorinated material and the alkoxide and/or hydroxyl groups associated with the polymeric metal oxide.

* * * * *